United States Patent
Smith

[11] Patent Number: 5,314,616
[45] Date of Patent: May 24, 1994

[54] PARTIAL FLOW FILTER SYSTEM FOR AN AUTOMATIC POWER TRANSMISSION MECHANISM

[75] Inventor: Lyle B. Smith, Westland, Mich.

[73] Assignee: Ford Motor Company, Dearborn, Mich.

[21] Appl. No.: 968,135

[22] Filed: Oct. 29, 1992

[51] Int. Cl.$^5$ .................. B01D 29/60; B01D 29/56; B01D 35/147

[52] U.S. Cl. .................. 210/130; 74/467; 184/6.24; 210/171; 210/335; 210/416.5; 475/159

[58] Field of Search ............ 210/130, 132, 168, 172, 210/335, 416.5, 420, 433.1, 434, 133, 171; 184/6.24; 180/339, 369; 74/467, 890; 123/196 A; 475/159

[56] References Cited

U.S. PATENT DOCUMENTS

| | | | |
|---|---|---|---|
| 3,038,353 | 6/1962 | Roche | 475/159 |
| 3,056,501 | 10/1962 | Thorman et al. | 210/132 |
| 3,132,535 | 5/1964 | Borman et al. | 74/883 |
| 4,496,460 | 1/1985 | Haarstad et al. | 210/132 |
| 4,637,281 | 1/1987 | Vanselous | 74/869 |
| 4,665,770 | 5/1987 | Vanselous | 74/89 |
| 4,832,836 | 5/1989 | Selsdon | 184/6.24 |
| 4,978,328 | 12/1990 | Pierce | 475/205 |
| 4,995,971 | 2/1991 | Droste et al. | 210/168 |
| 5,081,886 | 1/1992 | Person et al. | 74/866 |
| 5,083,481 | 1/1992 | Smith et al. | 74/869 |
| 5,091,078 | 2/1992 | Ogawa | 210/168 |
| 5,127,287 | 7/1992 | Taniguchi et al. | 210/168 |

Primary Examiner—Joseph W. Drodge
Attorney, Agent, or Firm—Roger L. May; Frank G. McKenzie

[57] ABSTRACT

A fluid filter system for use with a positive displacement pump in an automatic power transmission having a main filter located on the suction side of the power transmission pump and an auxiliary bypass filter located on the pressure side of the pump wherein provision is made for controlling the fluid flow through the auxiliary filter whereby bypass flow path through the auxiliary filter is decreased when the flow demand on the pump is increased, the auxiliary filter being adapted to filter small particle sizes and the main filter being adapted to filter and to retain larger particles.

9 Claims, 7 Drawing Sheets

PARTIAL FLOW FILTER SYSTEM FOR AN AUTOMATIC POWER TRANSMISSION MECHANISM

TECHNICAL FIELD

My invention comprises an automatic power transmission mechanism having multiple ratios and a positive displacement pump in a valve system for creating a control pressure for applying friction torque establishing devices, including improvements in a fluid filter circuit for the control valves.

BACKGROUND OF THE INVENTION

My invention comprises improvements in automatic power transmission mechanisms of the type shown, for example, in U.S. Pat. Nos. 4,978,328 and 5,081,886. Both of these patents disclose automotive vehicle transaxles having a hydrokinetic torque converter mounted on an engine axis and multiple ratio gearing mounted on an axis that is in parallel disposition with respect to the engine axis. Each transaxle has structural features that are similar to the other, although the transaxle of the '328 patent has five forward driving ratios, whereas the transaxle of the '886 patent has four forward driving ratios.

Each transaxle has a positive displacement pump that is connected drivably to the impeller shaft for a hydrokinetic torque converter situated on the engine crankshaft axis. A control valve body is secured to the transmission housing adjacent the positive displacement pump. The control valve body controls distribution of control pressure to pressure-operated servos for the clutches and brakes of the multiple ratio gearing.

An example of a control valve system capable of controlling the servos of the planetary gearing described in the '886 and '328 patents can be seen by referring to U.S. Pat. Nos. 4,637,281 and 4,665,770. U.S. Pat. No. 5,083,481 shows a control system capable of performing the functions of the hydraulic valve system of the '770 and '281 patents, but it includes microprocessor based electronic solenoid valve operators for triggering the operation of the hydraulic control valves in establishing ratio changes in the planetary gearing.

All of the patents referred to in the preceding discussion are assigned to the assignee of my present invention.

A transaxle of the type described above includes a housing and a transaxle sump in which is positioned an oil filter located on the suction side of the positive displacement pump. In a typical commercial embodiment of a transaxle of the kind described above, the filter on the suction side of the positive displacement pump is capable of filtering particles in the 60 micron range. It has been found, however, that particles that are of a size less than 60 microns will pass through a typical prior art filter system in the sump of the transaxle.

In a typical automotive-type transmission valve body having aluminum alloy valve elements in an aluminum alloy valve body, the manufacturing clearances for the valve elements and the bores in which they fit range from 0.0003 inch to 0.0013 inch. Therefore, it is possible for contaminant particles of sizes between 3 microns to 33 microns to enter the clearances and cause valve element sticking. This particle size range is not within the filtering capability of a typical prior art filter system which cannot capture particles smaller than about 60 microns.

Such valve element sticking may result in high warranty costs for the vehicle manufacturer. If an attempt were made to use finer filter medium in a filter system in the fluid supply line for a transaxle positive displacement pump, and if the filter medium were designed to entrap and to hold particles with sizes less than approximately 60 microns, inadequate fluid flow might occur when the filter medium becomes contaminated. Thus, the effective pump capacity might be reduced so that inadequate flow for the transaxle clutch and brake servos would be developed when high pump capacity is required.

BRIEF DESCRIPTION OF THE INVENTION

The filter system of my invention includes a bypass flow filter located on the pressure side of the transmission pump. This is a companion filter for the usual filter system located in the transmission sump on the suction side of the pump. Because a filter with small micron size capacity should not be used on either the suction side of the pump nor on the pressure side of the pump if the filter is a full flow filter, I have located my auxiliary filter system in a bypass flow passage designed to accept partial flow.

The filter medium in the bypass passage has both a low micron rating and a low flow rate. In this way, debris that is developed during the manufacturing process for the transmission, including loose metallic spurs, ingested airborne particles entering the transmission fluid through the breather, wear particles and contaminants introduced into the transmission fluid during oil check and oil addition can be removed by the auxiliary filter in a slow and methodical fashion, thereby removing particle of sizes less than 60 microns.

The transaxle of a preferred embodiment of my invention has a variable capacity pump and is provided with an adjustable pump stator ring. Pumping blades engage the ring as the pump rotor rotates, thereby transferring fluid from the intake side of the pump to the high pressure side. When the bore ring is shifted relative to the axis of the rotor, the pumping capacity of the pump changes.

The bypass flow path for the transfer of fluid through the auxiliary filter system is controlled by calibrated feed orifices. The pump bore ring controls the flow through the feed orifices so that maximum flow will occur through the feed orifices when the pump displacement is reduced. At maximum displacement of the pump, which occurs when the flow demands on a pump are high, the orifices are closed. Thus, the auxiliary filter is functional under all conditions other than the operating conditions that require maximum pump displacement.

Since maximum pump displacement occurs over a relatively low percentage of the total operating time, my improved filter system is capable of slowly and methodically filtering fine particles at a rate that is adequate to reduce the accumulation of contaminants that tend to collect in the valve clearances for the control valve body. It is capable of filtering and retaining small size particles throughout the operating life of the transaxle.

Provision is made for locating the auxiliary bypass filter system adjacent to the valve body within a side pan that serves as an auxiliary sump which complements the main sump at the base of the transmission housing. A thermal oil level control mechanism increases the flow of oil from the auxiliary sump to the main sump when the transmission fluid is cooled and restricts the flow from auxiliary sump to the main transmission sump when the temperature of the transmission fluid rises above a normal level to about 350° F. maximum. Oil bypassed through the auxiliary filter system of my invention will accumulate in the auxiliary sump prior to its transfer to the main sump. The thermal oil level control regulates the transfer of oil from the auxiliary sump to the main sump thereby maintaining a desired level of transmission fluid in the main sump throughout the operating temperature range of the transmission fluid. The presence of the bypass flow through the auxiliary filter system will not adversely affect this function of the oil level control mechanism. The oil level in the main transmission sump will remain constant when the temperature is less than that maximum value. The oil level will vary in the auxiliary sump.

PARTICULAR DESCRIPTION OF THE INVENTION

Figure 1:
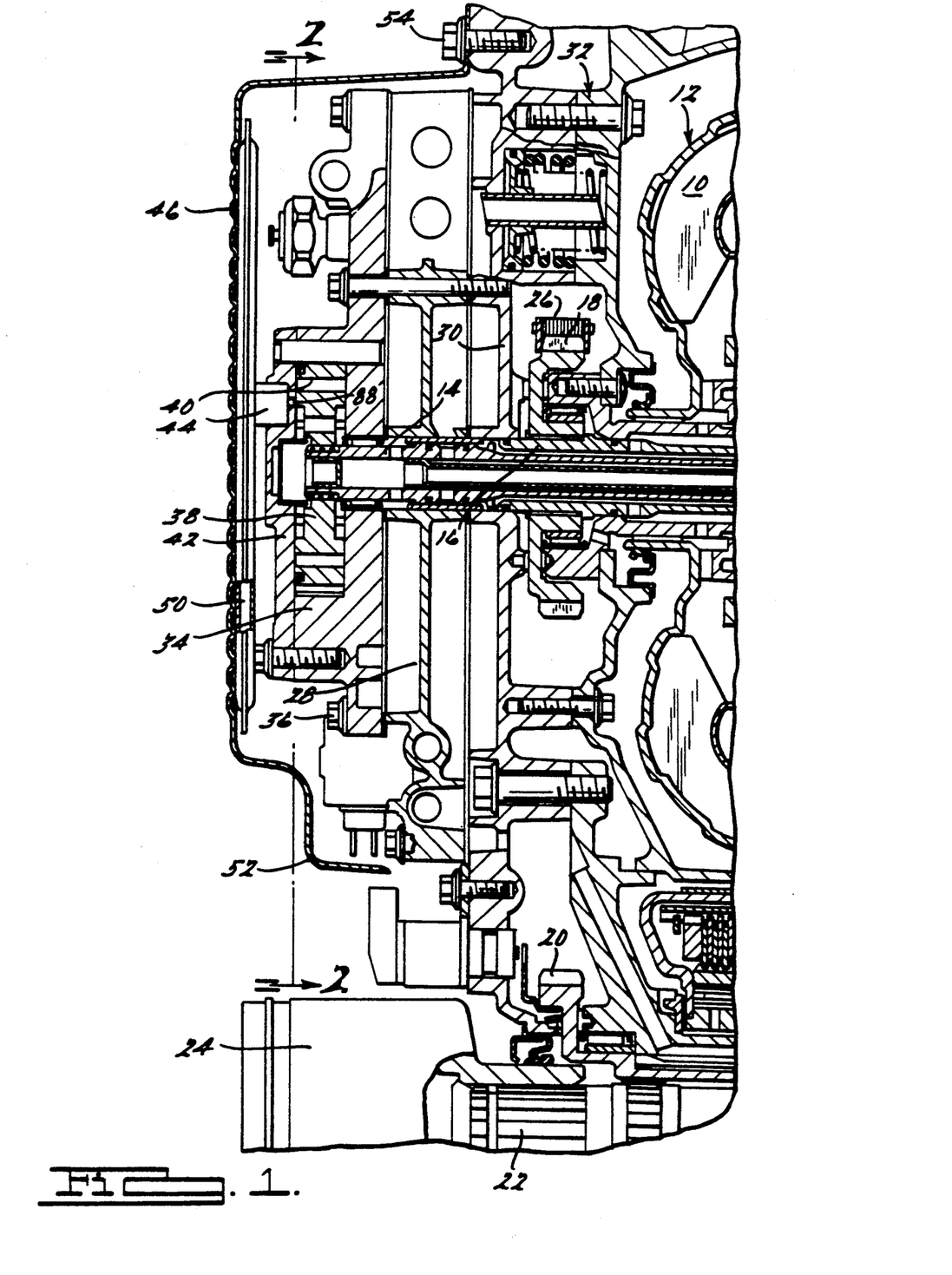
FIG. 1 is a partial cross-sectional view of a hydrokinetic torque converter transaxle mechanism that includes the auxiliary filtering system of my invention.

In FIG. 1, reference numeral 10 designates a bladed impeller for a hydrokinetic torque converter 12. The pump drive shaft 14 extends concentrically through a power output sleeve shaft 16. A drive sprocket 18 is splined to the shaft 16. A driven sprocket 20 is located on the output shaft axis of planetary gearing, not shown in FIG. 1. That gearing corresponds to the planetary gearing shown in the reference patents described above.

One of the torque output shafts shown at 22 is adapted to be connected to a traction wheel not shown, the driving connection with the traction wheel being provided by a constant velocity universal joint 24.

Driven sprocket 20 is connected drivably to driving sprocket 18 through a drive chain 26.. Thus, the power output shaft axis of the transaxle is spaced from and is parallel to the axis of the torque converter 12.

A control valve body 28 is secured to the chain housing portion 30 of the transmission housing generally indicated at 32.

A positive displacement pump housing 34 is secured to the control valve body 28 by bolts 36. A pump rotor 38 is splined to the shaft 14. As will be explained with reference to FIG. 2, the rotor 38 carries vanes which are disposed within a pump chamber 40. The chamber 40 is closed by a pump closure plate 42. As will be explained with reference to FIGS. 4 and 7, a fluid fitting 44, which forms a part of a filter assembly 46, is received in an opening formed in the cover plate 42. Flow restricting orifices 88 are situated between the high pressure outlet port for the pump and the fitting 44, the latter permitting, communication between the orifice 88 and the interior 50 of the assembly.

A cover 52, which forms a secondary oil reservoir, is bolted to the housing portion 30 by bolts 54.

Oil that is pressurized by the pump is distributed through the normal line pressure passages in the control valve body that contains the individual valve elements for controlling the servos for the transmission gearing as described in the prior art patents mentioned above. A portion of the fluid under pressure passes from the high pressure port of the pump through the orifices 88 to the interior of the assembly 46. The oil then passes through the filter material into the lower region of the side cover 52. The fluid collects in the side cover, which forms an auxiliary sump, and then drains through internal passages by way of a thermal oil level control valve mechanism to the main transmission sump illustrated as schematically in FIG. 2 at 54. Oil in the sump 54 is transferred through a main filter assembly 56 to the inlet side of the pump as indicated by the schematic directional flow line in FIG. 2.

Figure 2:
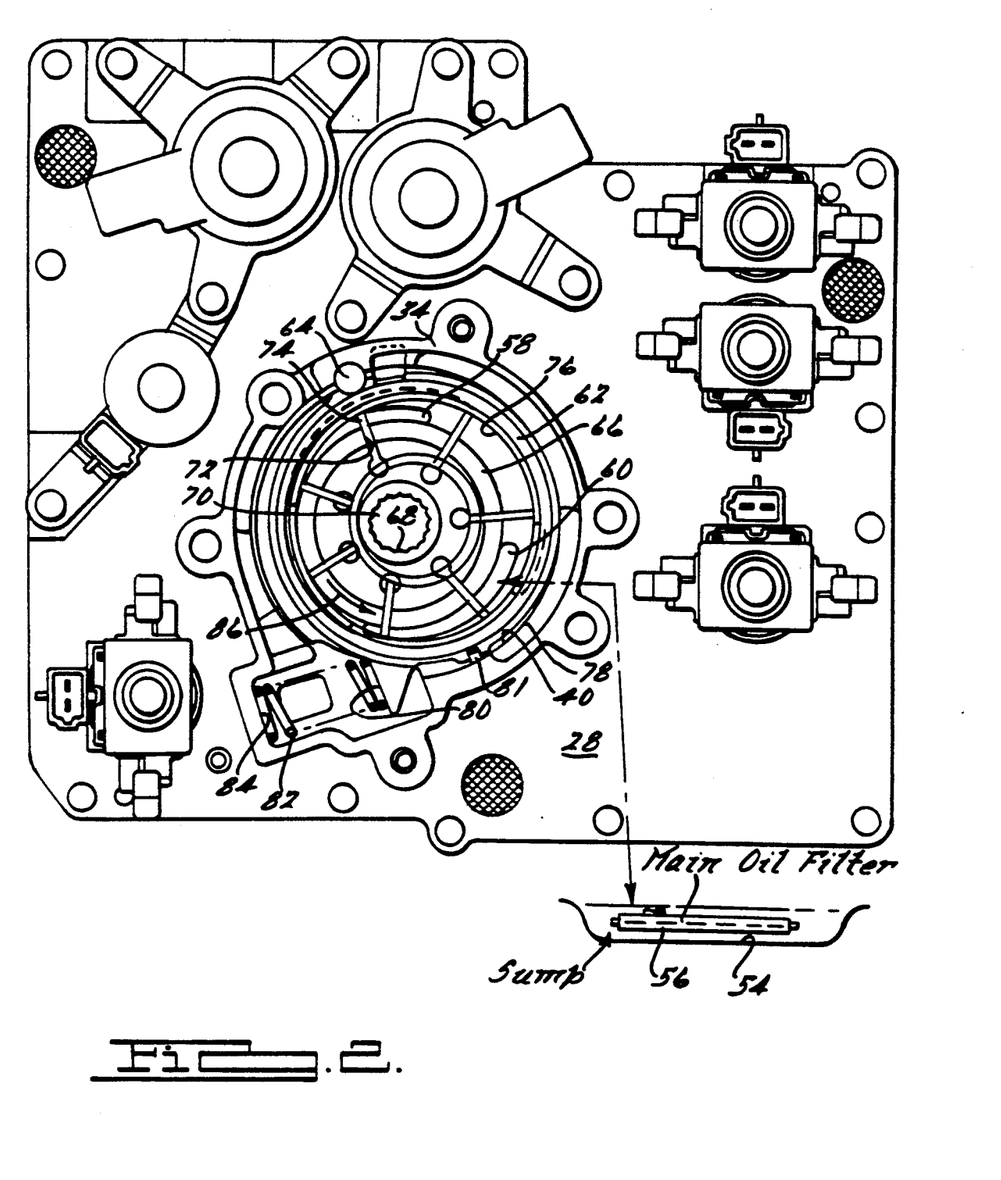
FIG. 2 is a cross-sectional view, partly in elevation, as seen from the plane of section line 2—2 of FIG. 1 showing the essential elements of a variable capacity positive displacement pump.

In FIG. 2, the pump housing 34 is secured to the valve body 28 and is formed with a pressure port of crescent shape, as shown at 58, and with a suction port of crescent shape, as shown at 60. A pump bore ring 62 is pivotally mounted on the pump housing by means of a pivot pin 64, the latter extending axially with respect to the axis of the pump. Pump rotor 66 is connected drivably by means of spline 68 to pump drive shaft end 70. The rotor 66 is provided with radial slots 72 in which are positioned pumping vanes 74, one vane being located at each slot.

The vanes 74 slidably engage the inner periphery 76 of the bore ring 62.

The pump bore ring 62 defines a pressure cavity 78 extending between fluid seal 81 and the pivot pin 64. That cavity is pressurized with fluid by means of an internal passage extending from the pressure port 58 to the chamber 78.

An extension 80 on the bore ring is acted on by pump spring 82 which is seated at 84 on the pump housing 34.

Figure 3:
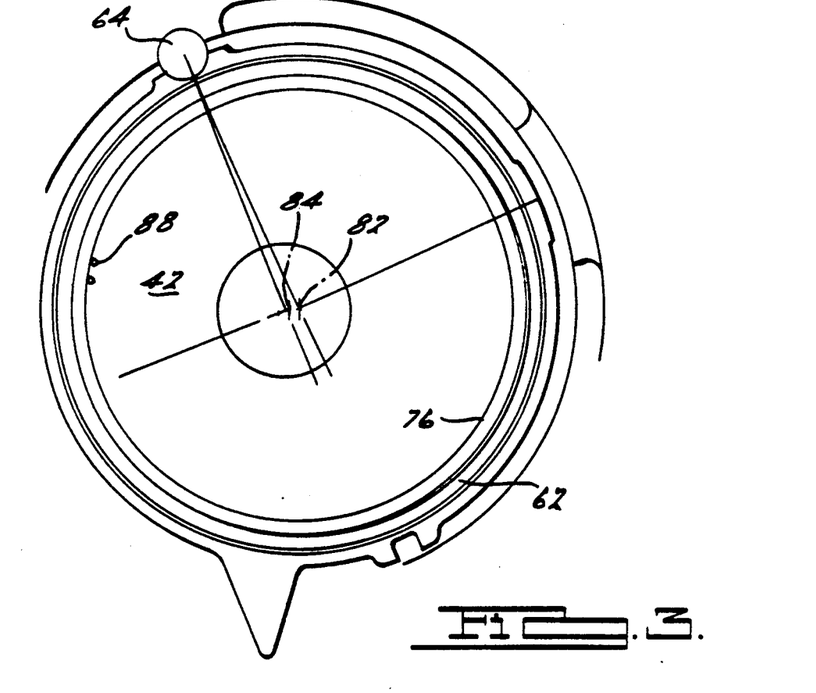
FIG. 3 is a diagrammatic representation of a pump bore ring for the pump shown in FIG. 2.
Figure 3A:
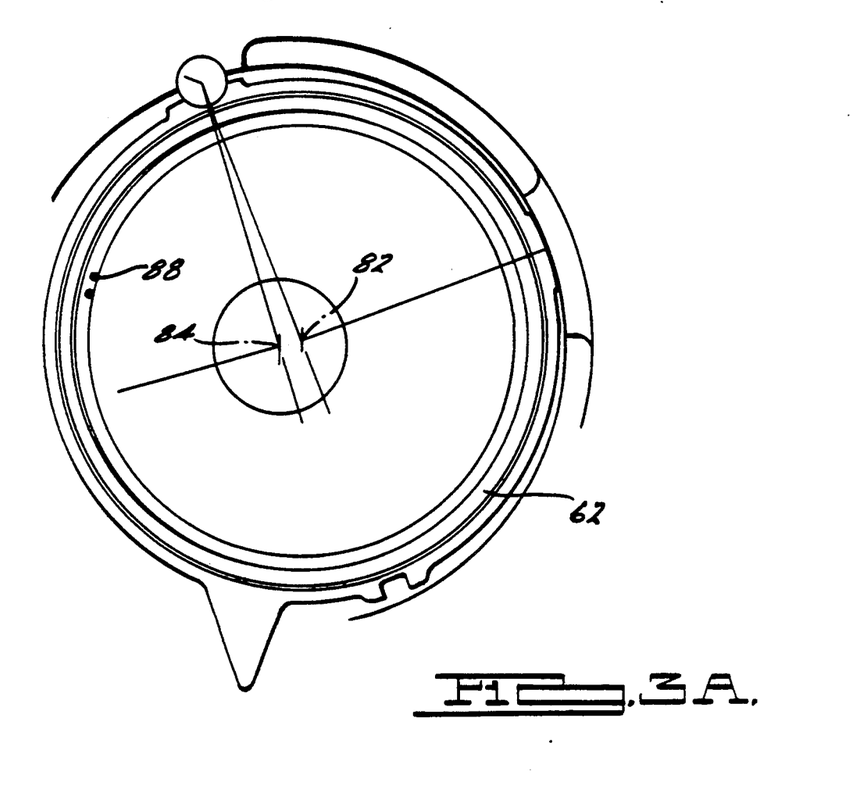
FIG. 3A is a view similar to FIG. 3 showing the pump bore ring in its maximum displacement position.

As seen in FIGS. 3 and 3A, the pump bore ring 62 can oscillate about the pivot pin 64. In the position shown at FIG. 3, the bore ring, which is centered at 82, is slightly displaced from the center 84 of the pump rotor 38. Thus, the space between adjacent pumping vanes, upon rotation of the rotor in the direction of the directional arrow 86 of FIG. 2, will carry fluid from the suction port 60 to the pressure port 58 thus increasing the pressure at the pressure port. Corresponding pumping chambers on the opposite side of the rotor will draw fluid through the suction port as the volume of the pumping chamber increases.

FIG. 3A shows the bore ring 62 in the maximum pump eccentricity position where the capacity of the pump is greatest. This is the position at which there is the greatest pump output.

The pump cover 42, as best seen in FIGS. 3 and 3A, is provided with a pair of calibrated flow metering orifices 88, previously identified in FIG. 1. They are located directly adjacent one edge of the bore ring 62. When the bore ring 62 is positioned as shown in FIG. 3, orifices 88 are uncovered. These orifices communicate with the high pressure port 58.

When the bore ring 62 moves from the minimum displacement position to the maximum displacement position as seen in FIG. 3A, the center of the bore ring shown at 82 is displaced from the rotor center 80 for a sufficient angular extent so that the orifices 88 are closed by the side of the bore ring 62. This interrupts flow from the high pressure port through the orifices 88. Thus, when the pump is at its maximum displacement, the flow through the orifices 88 and into the interior 50 of the filter assembly is interrupted. Thus there is no decrease in the pumping capacity because of the bypass flow through the filter assembly 46. On the other hand, when the capacity of the positive displacement pump is a minimum, the orifices 88 are uncovered thereby permitting bypass flow to occur.

Figure 4:
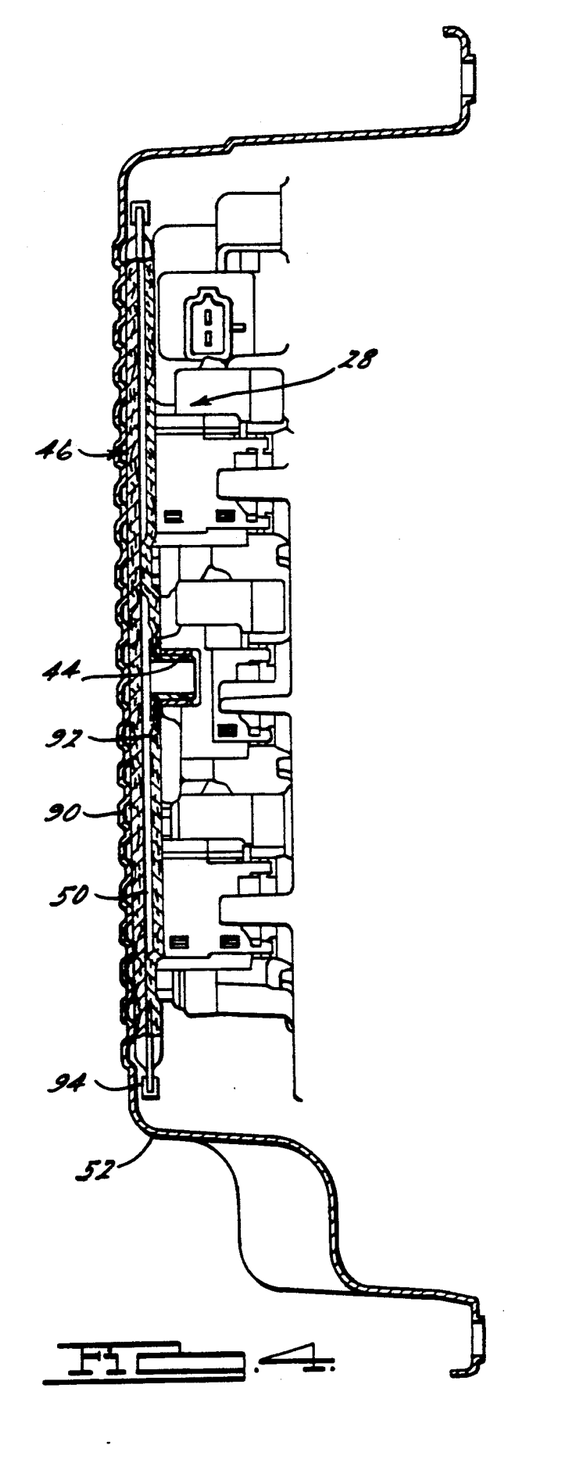
FIG. 4 is an assembly view showing the pump body and filter assembly seen in the overall assembly view of FIG. 1.

As seen in FIG. 4, pump cover 52 is provided with corrugations 90 against which the filter assembly 46 is supported. The fluid fitting 44 is received in a centrally positioned opening on one side 92 of the assembly 46. The margin of the assembly 46 is heat-seam welded, as shown at 94, thereby defining the closed interior 50 described previously.

Figure 5:
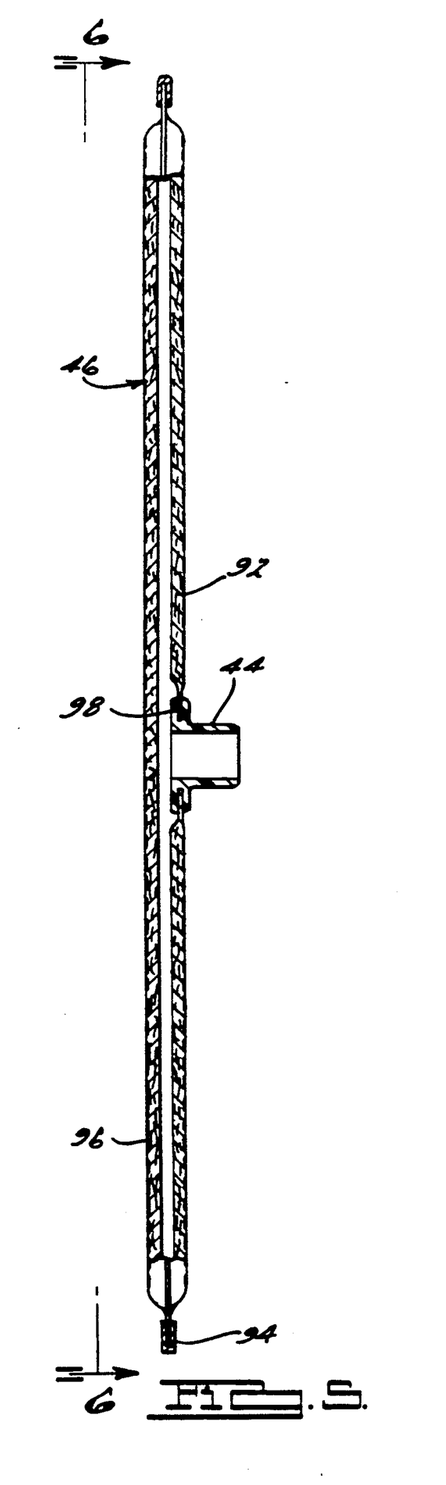
FIG. 5 is a transverse cross-sectional view of the filter seen in the assembly view of FIG. 4.

The filter assembly is shown in more particular detail in FIG. 5. It includes a filter medium which defines an envelope enclosing the interior cavity 50. It is easily accessible for service purposes merely by removing the cover 52. A 500 mesh nylon screen 96 is provided on one side of the filter assembly 46 to provide support. The screen 96 engages the corrugations 90 on the cover 52. The heat-seam weld on the periphery 94 also provides a unitary juncture that includes the margin of the screen 96.

The fitting 44 at the center of the filter 92 may be formed of nylon, 90% glass filled. It is provided with an inner margin 98 in which is embedded the inner margin of the side 92 of the filter assembly 46.

Figures 6, 7, 8:
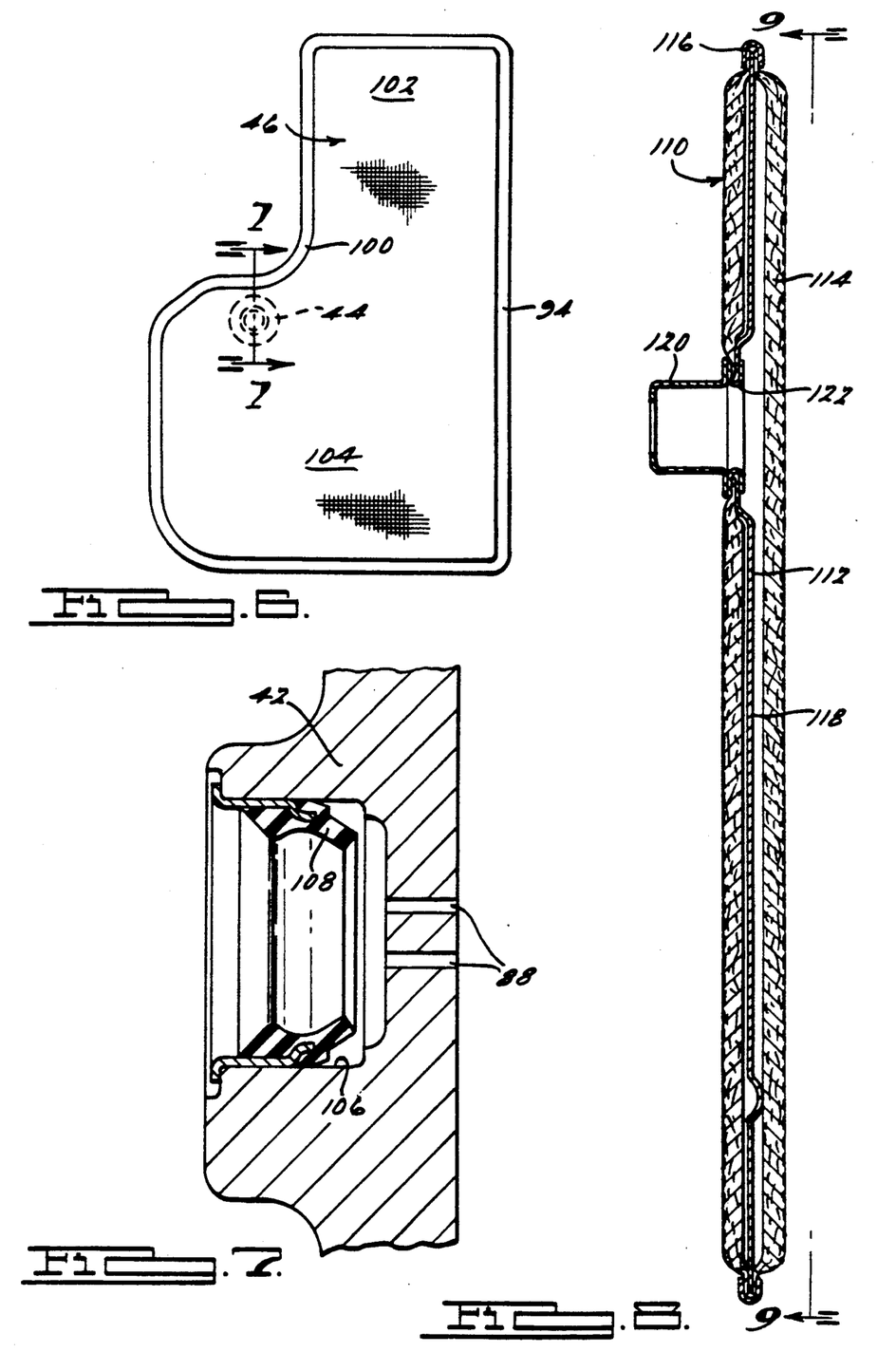
FIG. 6 is a side plan view showing the filter of FIG. 5 as seen from the plane of section line 6—6 of FIG. 5.
FIG. 7 is a cross-sectional view of the fluid fitting between the transmission valve body and the filter of FIG. 5 and the flow control orifices on the high pressure side of the positive displacement pump which form a part of the bypass filter flow path.
FIG. 8 is a view similar to the view of FIG. 5 but which shows an alternate filter construction for use in the transaxle environment illustrated in FIG. 1.

FIG. 6 shows in plan view the overall shape of the filter assembly 46. It includes a reverse curve portion 100 joining a narrow section 102 with a large width section 104. This shape of the filter assembly shown at 46 will prevent interference with portions of the valve body in the cavity between the valve body and the cover 52.

In FIG. 7, the opening for the fitting 44, which is formed in the pump cover plate 42, is shown in an enlarged view. The fitting 44 is adapted to be received in opening 106. A fluid seal 108 is provided as shown in the opening 106. When the fitting 44 is assembled, seal 108 establishes a fluid-tight connection between orifices 88 and the cavity 50 in the seal assembly 46.

Figure 10:
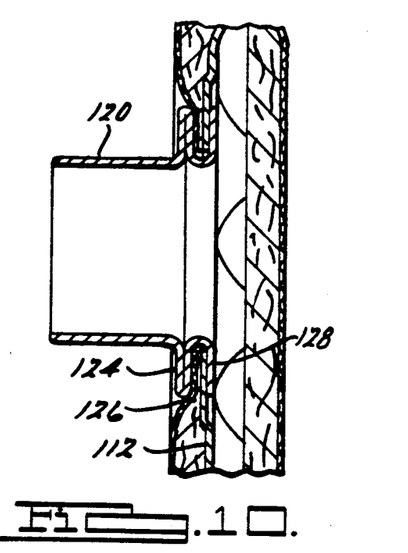
FIG. 10 is a cross-sectional view of the fluid fitting for the filter of FIG. 8 as seen from the plane of section line 10—10 of FIG. 9.

In FIG. 8, I have shown an alternate embodiment of the seal assembly. It is designated at 110 and includes a stamped metal support plate 112 about which filter material 114 is positioned. The margin 116 of the plate 112 is joined to provide a unitary juncture between it and the margin of the sides of the filter envelope. The interior 118 is in communication with the interior of a fluid fitting 120 which is secured at the inner margin 122 of an opening formed in the plate 112. The connection between the fitting 120 and the plate 112 is shown in more detail in FIG. 10. The margin of the fitting 120 includes a re-entrant peripheral bead 124 against which the plate 118 and the inner margin of the filter material 126 is crimped by the end 128 of the fitting 120.

Figure 9:
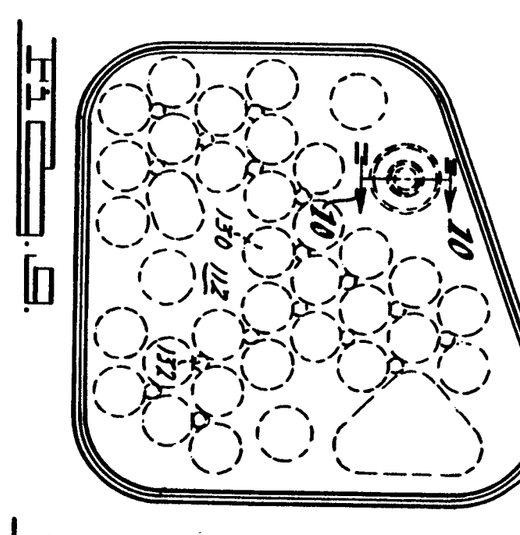
FIG. 9 is a plan view of the filter medium illustrated in FIG. 8 as seen from the plane of section line 9—9 of FIG. 8.

The plate 112 as seen in FIG. 9 is provided with holes 130 and projections 132. Projections 132 engage the inner sides of the filter material of the envelope. This permits free flow of transmission oil uniformly throughout the inner surface of the envelope.

During operation of the pump, the filter feed is taken directly from the variable displacement pump pressure port. The orifices 88 are located where they can be totally shut-off when the bore ring is at its maximum displacement position. Thus, the filter is fed through the orifices only when the pump has excess capacity. Thus, it is not necessary to use a main pump of increased capacity, nor an auxiliary pump in order to implement the auxiliary filter.

Two orifices having a size of about 0.020 inch diameter (or one orifice having a size of 0.030 to 0.040 inch) will provide about $\frac{1}{8}$ to $\frac{1}{4}$ half gallons per minute flow through the secondary filter assembly. The restriction provided by the orifices will provide enough restriction during cold temperature operation to protect the filter from bursting.

Even though the filter flow will be eliminated during maximum pump capacity operation and restricted during cold operating conditions, the filter will be effective to slowly filter small contaminants throughout the major part of the total operating range of the transaxle. The filter material is capable of accumulating contaminants that would normally collect in valve clearances in the valve body.

In a preferred embodiment, about 150 square inches of filter medium will provided adequate flow for an automotive-type transaxle.

We prefer to use a depth-type filter medium formed of non-woven felt medium from 100% dacron polyester fibers. The fibers are intertwined to provide maximum integrity and filter efficiency. The unwanted particle sizes, ranging from 3 to 33 microns, will be removed from the fluid by entrapping them and adsorbing them throughout the depth of the filter material.

The filter material, in a preferred embodiment, is 2.5 millimeters thick. It may be a depth-filtration product manufactured by Lydall, Inc. of Hamptonville, N.C., and marketed under the trademark Lypore ®. The filter material is a needle-punched, non-woven felt medium made from 100% dacron-polyester fibers that are intertwined to provide maximum integrity and efficiency. Density of the fibers varies throughout the thickness of the filter which makes the filter capable of mechanically entrapping and adsorbing particles.

Figure 11:
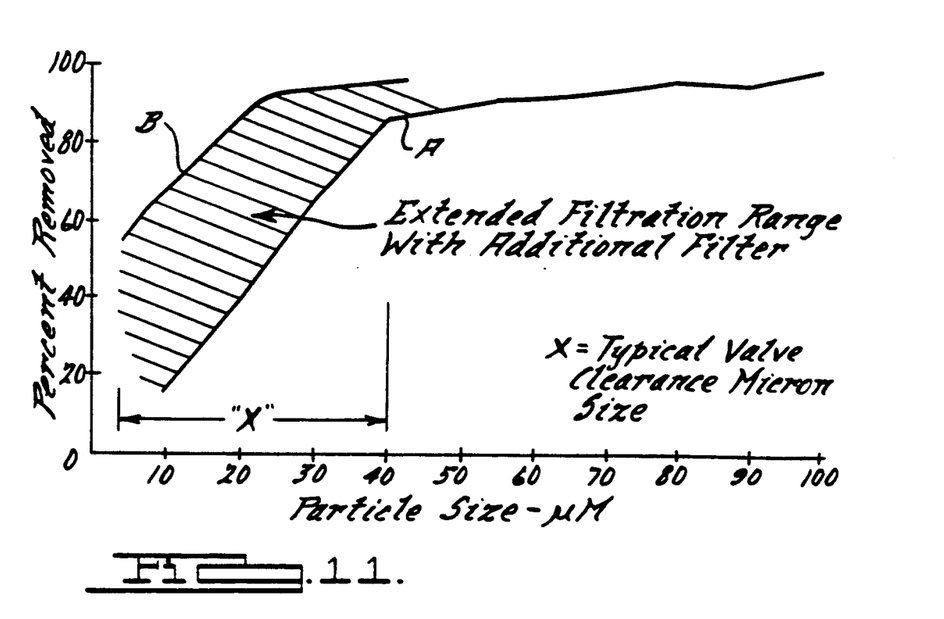
FIG. 11 is a chart showing the filter efficiency for the filter assembly of my invention. Filter efficiency for purposes of FIG. 11 is the percentage of particles removed for each particle size throughout a range of 0 to 60 microns.

FIG. 11 shows the filtering efficiency determined by the number of particulates retained by a filter as a function of the total number and size of the particles in the fluid. A conventional filter capable of filtering 60 micron particles is indicated by curve A in FIG. 11. Curve B is the corresponding performance chart using my improved filter system. The shaded area between my lines A and B represent the extended filtration range that is made possible by the use of the improved filter system of my invention.

Figure 12:
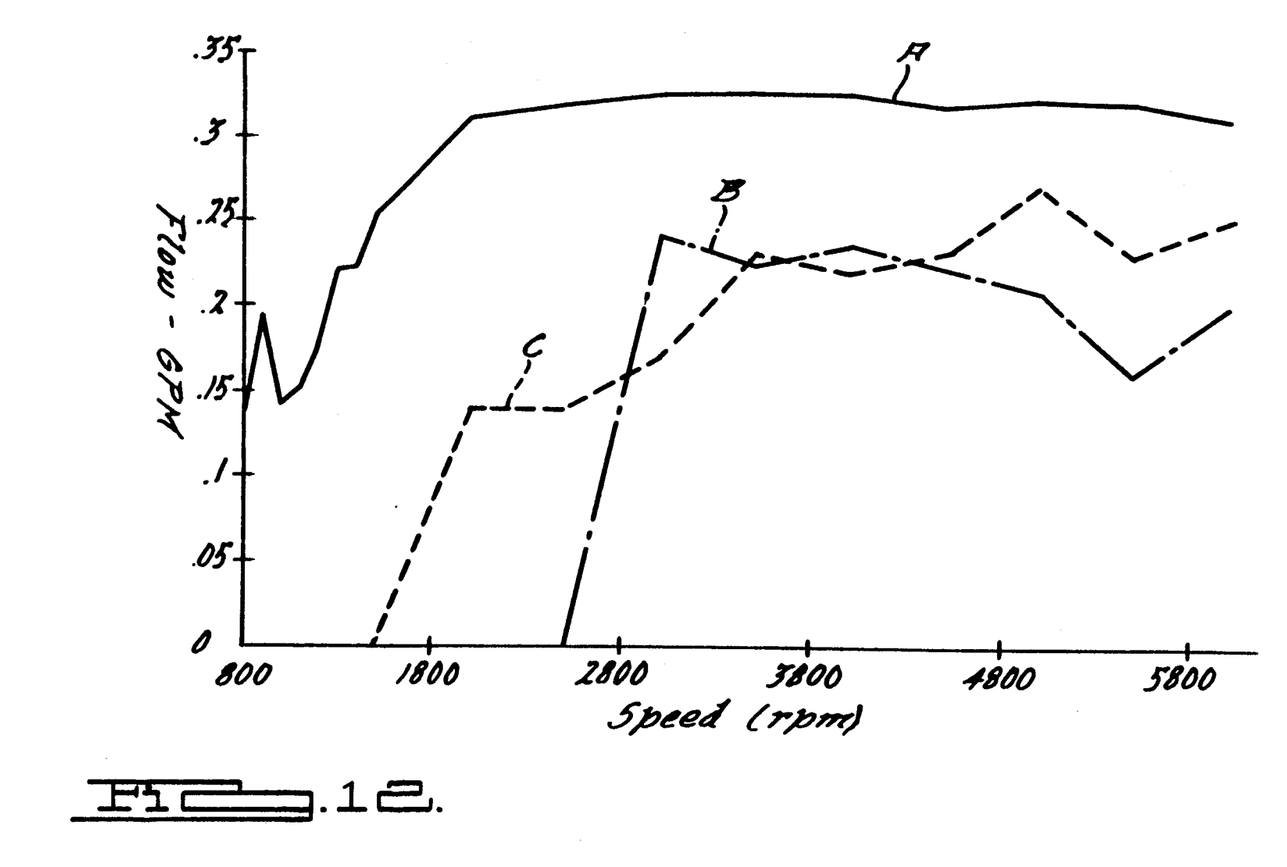
FIG. 12 is a chart that shows the relationship between filter flow through the bypass flow path and the speed of the positive displacement pump.

FIG. 12 shows a relationship between flow measured in gallons per minute and pump speed for a transmission having minimum throttle pressure, nominal throttle pressure and maximum throttle pressure. The curve corresponding to the minimum throttle pressure condition is shown at A in FIG. 12. The nominal throttle pressure curve is shown at B and the maximum throttle pressure curve is shown at C.

Throttle valve pressure is related functionally to engine throttle opening and is an indicator of engine torque. When throttle pressure is high, the torque transmitting requirements of the transmission are high and the pump flow requirements of the pump are high. Thus, the bore ring of the pump is shifted to its maximum displacement position. This operating mode, which is shown by curve C, results in zero flow through the auxiliary filter until the pump speed exceeds 1500 RPM. The flow then increases to a maximum average value of 0.25 gallons per minute after the pump speed reaches a value of about 4000 RPM. On the other hand, when the torque transmitting requirements and the throttle pressure are low, flow occurs through the filter even at low speeds, as indicated by the curve A in FIG. 12. Also since both orifices are fully opened, the flow of delivery through the auxiliary filter is the highest.

The oil temperature at which the data of FIG. 12 was obtained is 200F. If the oil were cold, the flow through the filter at all speeds would be lower.

Having described preferred embodiments of my invention, what I claim and desire to secure by U.S. Letters Patent is:

1. A transmission fluid filtering system configured and arranged for use in an automatic power transmission mechanism comprising a positive displacement fluid pump in a fluid sump with a high pressure side and a low pressure side;
   a fluid supply passage means for supplying fluid from said sump to said low pressure side of said pump;
   a primary filter in said supply passage means;
   a flow metering passage in communication with said high pressure side of said pump;
   a secondary filter communicating with said flow metering passage whereby a portion of the fluid delivered by said pump is bypassed through said metering passage to said secondary filter;
   means for returning fluid bypassed to said secondary filter to said sump, said pump being a variable displacement sump comprising a movable pump displacement control member; and
   valve means responsive to movement of said displacement control member toward a maximum displacement position for decreasing the flow through said metering passage in response to the flow delivery rate of said pump increasing.

2. The combination as set forth in claim 1 wherein said secondary filter is comprised of a filter medium with a filtrate efficiency of less than 40 microns.

3. The combination as set forth in claim 1 wherein said secondary filter is comprised of a depth filtration fiber matrix adapted to entrap and to adsorb contaminant particles of less than 20 microns.

4. A fluid filtering system configured and arranged for use in an automatic transmission having multiple ratio gear components and fluid pressure operated servos for actuating said servos;
   a control valve circuit having a movable valve means for controlling activation and release of said servos;
   a transmission control pump having a high pressure delivery passage communicating with said valve circuit;
   a transmission fluid sump in a lower portion of said transmission, said pump having a low pressure side in fluid communication with said sump;
   a primary fluid filter in said sump;
   a restricted flow passage communicating with said high pressure pump side;
   a secondary filter communicating with said restricted flow passage and having a discharge side communicating with said sump, said pump being a variable displacement pump comprising a movable pump displacement control member; and
   valve means for decreasing flow through said restricted flow passage in response to an increase in demand for flow from said high pressure side of said pump.

5. The combination as set forth in claim 4 wherein said secondary filter is comprised of a filter medium with a filtrate efficiency of less than 40 microns.

6. The combination as set forth in claim 4 wherein said secondary filter is comprised of a depth filtration fiber matrix adapted to entrap and to adsorb contaminant particles of less than 20 microns.

7. A filtering system configured and arranged for use in an automotive transmission including a primary filter and a secondary bypass filter;
   said transmission having multiple ratio gear components and fluid pressure operated servos for actuating said servos;
   a control valve circuit having movable valve means for controlling actuation and release of said servos;
   a variable displacement transmission control pump having a high pressure side communicating with said valve circuit;
   a transmission fluid sump in a lower portion of said transmission, said pump having a low pressure fluid supply side in fluid communication with said sump;
   cover for said valve means, said cover defining a secondary fluid reservoir at a location above said sump, means for transferring fluid from said secondary reservoir to said sump, said pump having a pump housing, a restricted flow orifice in said housing communicating with said high pressure pump side;
   said secondary by pass filter in said cover communicating with said restricted flow orifice whereby fluid is bypassed through said restricted flow orifice and through said bypass filter;
   said pump having a pump displacement control member movable between a maximum displacement position to a minimum displacement position, said control member registering with said restricted flow orifice and adapted to reduce the effective fluid flow area of said restricted flow orifice when said displacement control member is moved toward a maximum displacement position.

8. The combination as set forth in claim 7 wherein said bypass filter is comprised of a filtering medium with a filter efficiency of less than 40 microns.

9. The combination as set forth in claim 7 wherein said bypass filter is comprised of a depth filtration fiber matrix adapted to entrap and to adsorb contaminate particles of less than 20 microns.

* * * * *